(12) United States Patent
Lin et al.

(10) Patent No.: US 7,925,644 B2
(45) Date of Patent: Apr. 12, 2011

(54) EFFICIENT RETRIEVAL ALGORITHM BY QUERY TERM DISCRIMINATION

(75) Inventors: Chenxi Lin, Beijing (CN); Lei Ji, Beijing (CN); HuaJun Zeng, Beijing (CN); Benyu Zhang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/038,652

(22) Filed: Feb. 27, 2008

(65) Prior Publication Data

US 2008/0215574 A1 Sep. 4, 2008

Related U.S. Application Data

(60) Provisional application No. 60/892,418, filed on Mar. 1, 2007.

(51) Int. Cl.
 *G06F 17/30* (2006.01)
 *G06F 7/00* (2006.01)
(52) U.S. Cl. ............ 707/713; 707/723; 707/736
(58) Field of Classification Search .......... 707/713, 707/723, 736, 999.5
 See application file for complete search history.

(56) References Cited

U.S. PATENT DOCUMENTS

| | | | | |
|---|---|---|---|---|
| 5,263,159 A * | 11/1993 | Mitsui | | 1/1 |
| 5,826,260 A * | 10/1998 | Byrd et al. | | 1/1 |
| 5,907,840 A * | 5/1999 | Evans | | 1/1 |
| 5,920,854 A * | 7/1999 | Kirsch et al. | | 1/1 |
| 5,926,811 A * | 7/1999 | Miller et al. | | 707/748 |
| 6,138,114 A * | 10/2000 | Horowitz | | 1/1 |
| 6,205,443 B1 * | 3/2001 | Evans | | 1/1 |
| 6,408,294 B1 * | 6/2002 | Getchius et al. | | 1/1 |
| 6,519,586 B2 * | 2/2003 | Anick et al. | | 707/742 |
| 6,546,388 B1 | 4/2003 | Edlund et al. | | |
| 6,594,658 B2 | 7/2003 | Woods | | |
| 6,947,930 B2 * | 9/2005 | Anick et al. | | 1/1 |
| 7,047,242 B1 * | 5/2006 | Ponte | | 1/1 |
| 7,203,675 B1 * | 4/2007 | Papierniak et al. | | 707/600 |
| 7,243,092 B2 * | 7/2007 | Woehler et al. | | 1/1 |
| 7,269,545 B2 * | 9/2007 | Agichtein et al. | | 704/9 |
| 7,424,488 B2 * | 9/2008 | Aggarwal et al. | | 1/1 |
| 7,685,091 B2 * | 3/2010 | Boone et al. | | 705/7 |
| 2002/0169595 A1 * | 11/2002 | Agichtein et al. | | 704/9 |
| 2003/0217047 A1 * | 11/2003 | Marchisio | | 707/3 |
| 2005/0210006 A1 * | 9/2005 | Robertson et al. | | 707/3 |
| 2006/0074883 A1 * | 4/2006 | Teevan et al. | | 707/3 |
| 2006/0259482 A1 * | 11/2006 | Altevogt et al. | | 707/5 |

(Continued)

OTHER PUBLICATIONS

"Okapi BM25", Wikipedia, downloaded from en.wikipedia.org/wiki/Okapi_BM25, Jun. 18, 2010, pp. 1-4.*

(Continued)

*Primary Examiner* — Robert Stevens
(74) *Attorney, Agent, or Firm* — Lee & Hayes, PLLC

(57) ABSTRACT

A method and system for use in information retrieval includes, for each of a plurality of terms, selecting a predetermined number of top scoring documents for the term to form a corresponding document set for the term. When a plurality of terms are received, optionally as a query, the system ranks, using an inverse document frequency algorithm, the plurality of terms for importance based on the document sets for the plurality of terms. Then a number of ranked terms are selected based on importance and a union set is formed based on the document sets associated with the selected number of ranked terms.

19 Claims, 5 Drawing Sheets

U.S. PATENT DOCUMENTS

| | | | |
|---|---|---|---|
| 2006/0277173 A1* | 12/2006 | Li et al. | 707/5 |
| 2007/0185871 A1* | 8/2007 | Canright et al. | 707/7 |
| 2007/0198459 A1* | 8/2007 | Boone et al. | 707/1 |
| 2008/0288483 A1* | 11/2008 | Lin et al. | 707/5 |

OTHER PUBLICATIONS

Cao, Yunbo, et al., "Adapting Ranking SVM to Document Retrieval", SIGIR '06, Seattle, WA, Aug. 6-11, 2006, pp. 186-193.*

Robertson, Stephen, "Understanding Inverse Document Frequency: On Theoretical Arguments for IDF", Journal of Documentation, vol. 60. No. 5, © 2004, pp. 1-19.*

Trotman, Andrew, "Choosing Document Structure Weights", Information Processing and Management, vol. 41, Issue 2, Mar. 2005, pp. 243-264.*

Singhal, Amit, et al., "Document Length Normalization", Information Processing and Management, vol. 32, Issue 5, Sep. 1996, pp. 619-633.*

Hawking, David, et al., "Toward Better Weighting of Anchors", SIGIR '04, Sheffield, South Yorkshire, UK, Jul. 25-29, 2004, pp. 512-513.*

Anh, Vo Ngoc, et al., "Simplified Similarity Scoring Using Term Ranks", SIGIR '05, Salvador, Brazil, Aug. 15-19, 2005, pp. 226-233.*

Mishra, Rajeev Kumar, et al., "KhojYantra: An Integrated MetaSearch Engine with Classification, Clustering and Ranking", IDEAS 2000, Yokohama, Japan, Sep. 18-20, 2000, pp. 122-131.*

Yang, Lingpeng, et al., "Document Re-ranking Using Cluster Validation and Label Propagation", CIKM '06, Arlington, VA, Nov. 5-11, 2006, pp. 690-697.*

Vechtomova, Olga, et al., "Interactive search refinement techniques for Hard tasks", www.scientificcommons.org/43269845, © 2004, pp. 1-8.*

Cummins, Ronan, et al., "Evolving General Term-Weighting Schemes for Information Retrieval: Tests on Larger Collections", Artificial Intelligence Review, vol. 24, Nos. 3-4, Nov. 2005, pp. 277-299.*

Vinay, Vishwa, et al., "On Ranking the Effectiveness of Searches", SIGIR '06, Seattle, WA, Aug. 6-11, 2006, pp. 398-404.*

Osiński, Stanislaw, et al., "Lingo: Search Results Clustering Algorithm Based on Singular Value Decomposition", Springer Verlag, © 2004, pp. 359-368.*

Gravano, Luis, et al., "GIOSS: Text-Source Discovery over the Internet", ACM Transactions on Database Systems, vol. 24, No. 2, Jun. 1999, pp. 229-264.*

Li, Longzhuang, et al., "Improvement of HITS-based Algorithms on Web Documents", WWW 2002, Honolulu, HI, May 7-11, 2002, pp. 527-535.*

* cited by examiner

US 7,925,644 B2

EFFICIENT RETRIEVAL ALGORITHM BY QUERY TERM DISCRIMINATION

RELATED APPLICATION

This non-provisional patent application claims the benefit of and priority to U.S. Provisional Patent Application 60/892,418, entitled "Efficient Retrieval Algorithm by Query Term Discrimination", filed Mar. 1, 2007, which is incorporated by reference herein, in its entirety.

BACKGROUND

Information retrieval (IR) technology is widely used in search engines for web searches. Generally, inverted indexing is used to increase speed of a retrieval algorithm. However, as data scale becomes large, scanning candidate items in an index table can become quite time consuming. Such time demands can affect tasks such as retrieval of relevance ads. For example, a conventional system may need to retrieve relevance ads from tens of millions of ads in a time period of about 30 ms. Thus, a need exists for more efficient retrieval technology.

SUMMARY

An exemplary method for use in information retrieval includes, for each of a plurality of terms, selecting a predetermined number of top scoring documents for the term to form a corresponding document set for the term; receiving a plurality of terms, optionally as a query; ranking the plurality of terms for importance based at least in part on the document sets for the plurality of terms where the ranking comprises using an inverse document frequency algorithm; selecting a number of ranked terms based on importance where each selected, ranked term comprises its corresponding document set wherein each document in a respective document set comprises a document identification number; forming a union set based on the document sets associated with the selected number of ranked terms; and, for a document identification number in the union set, scanning a document set corresponding to an unselected term for a matching document identification number. Various other exemplary systems, methods, devices, etc. are also disclosed.

DESCRIPTION OF THE DRAWINGS

Non-limiting and non-exhaustive examples are described with reference to the following figures.

DETAILED DESCRIPTION

Exemplary retrieval technology is described herein. Such Information Retrieval (IR) technology may be used in search engines for performing web searches. A document (e.g., a webpage, an advertisement, etc.) may be referred to as an item. IR technology typically aims to rank items based on one or more relevance criteria (e.g., query information, common information between items, etc.). Items ranked highly may be considered more important than other items (e.g., those with lower rank). An exemplary retrieval method operates by selecting a set of most important items from an index table to be used as candidate items and implementing a merge algorithm that calculates scores of the items for a ranking. Such a method can achieve high accuracy while being very efficient.

As described herein, an exemplary method can include selecting a set of items as candidates to speed up retrieval, selecting a set of important items which covers the most relevant items and/or implementing an exemplary merge algorithm that calculates a score of pre-selected candidate items in an inverted index table.

Figure 1:
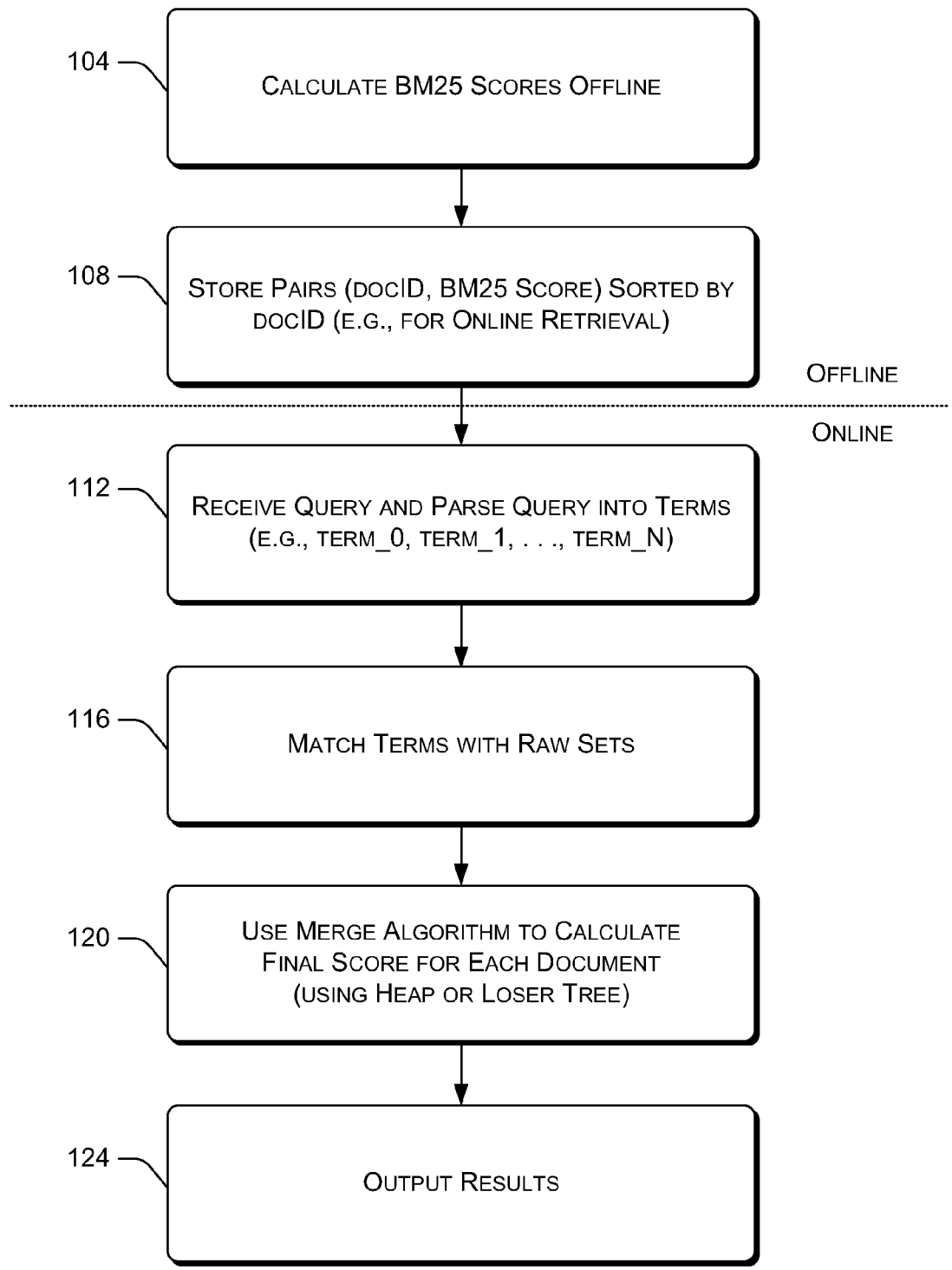
FIG. 1 is a diagram of a conventional method that includes an offline portion and an online portion for selecting documents in response to a query.

FIG. 1 shows a conventional method 100 that provides a framework for understanding various terms and processes related to searching and retrieval. In the method 100, a calculation block 104 calculates scores for documents using a BM25 algorithm. A storage block 108 stores data pairs (e.g., tuples) as document identification number (e.g., docID) and corresponding BM25 score. The action blocks 104 and 108 are typically performed offline where the stored pairs can be used in a subsequent online search.

A reception block 112 operates online to receive a query (e.g., submitted by a user) and to parse the query into terms, which may be identified as term_0, term_1, . . . , term_N, where N is the total number of terms in the query after parsing. A match block 116 matches the terms to an appropriate number of raw sets. Next, a merge block 120 uses a conventional merge algorithm to calculate a final score for each document (e.g., using a heap or a loser tree). After calculation, a result or results may be output online by an output block 124. For example, a user may input a query (e.g., one or more terms) and then receive a list of items as "search results" where the items are ordered in the list according to their individual scores.

In general, the BM25 algorithm or ranking formula is derived from a probabilistic model that includes assigning to each term appearing in a given document a weight depending on a count (e.g., the number of occurrences of the term in the document), on a frequency (e.g., the number of the documents in which the term appears) and on document length (e.g., in words). A document can be represented as a vector of term frequencies $d:=(f_1, \ldots, f_i, \ldots, f_M)$ where $f_i$ is the document term frequency (number of occurrences) of the i-th term in the vocabulary. As already explained, a query can be represented as the set of terms in the original user query (e.g., via parsing or other technique). "Okapi" is the name of a particular retrieval engine that supports the BM25 algorithm (an okapi is an animal in the family Giraffidae).

Figure 2A:
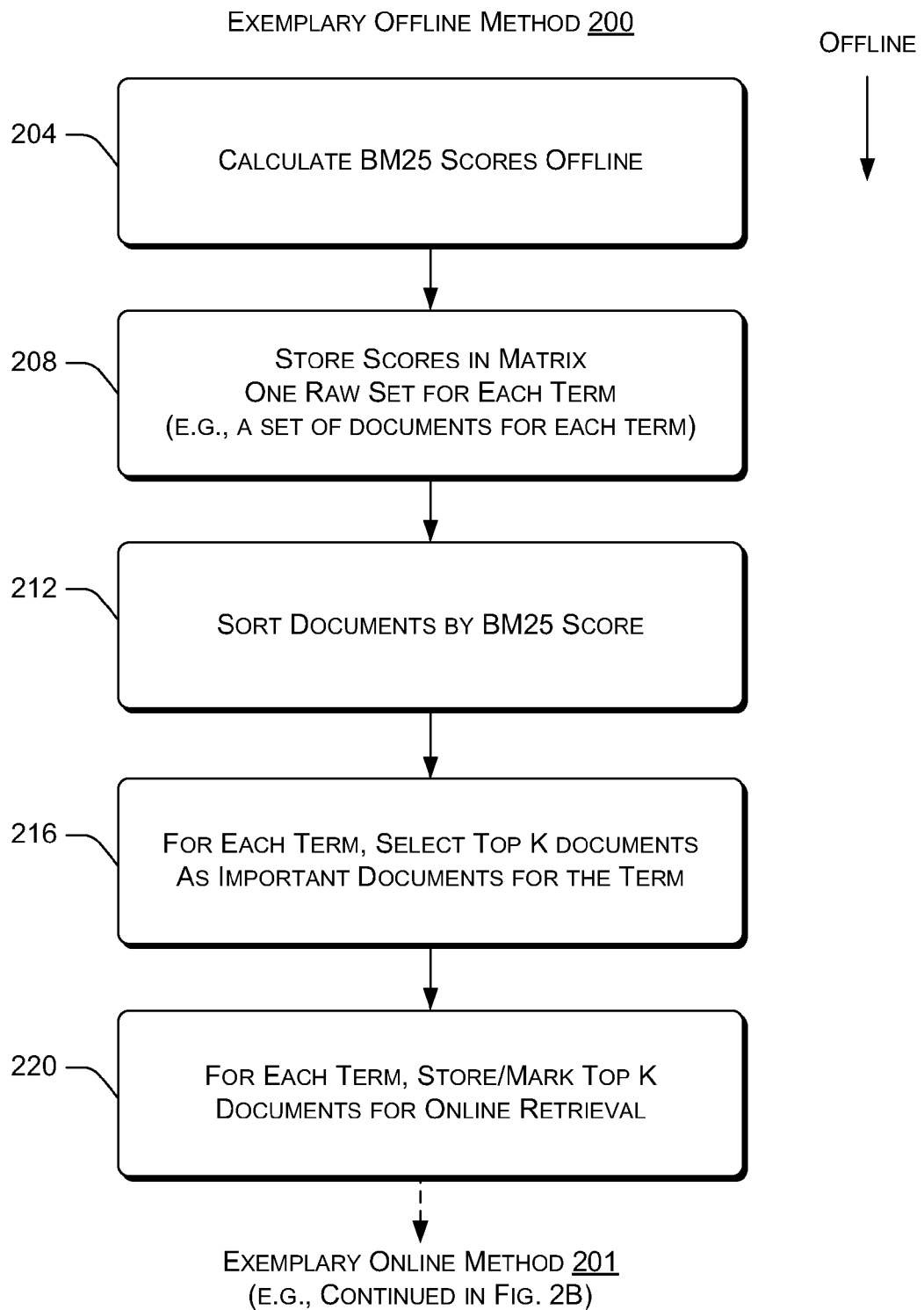
FIG. 2A is a diagram of an exemplary offline method for selecting documents for latter use in an exemplary online method for selecting documents in response to a query.
Figure 2B:
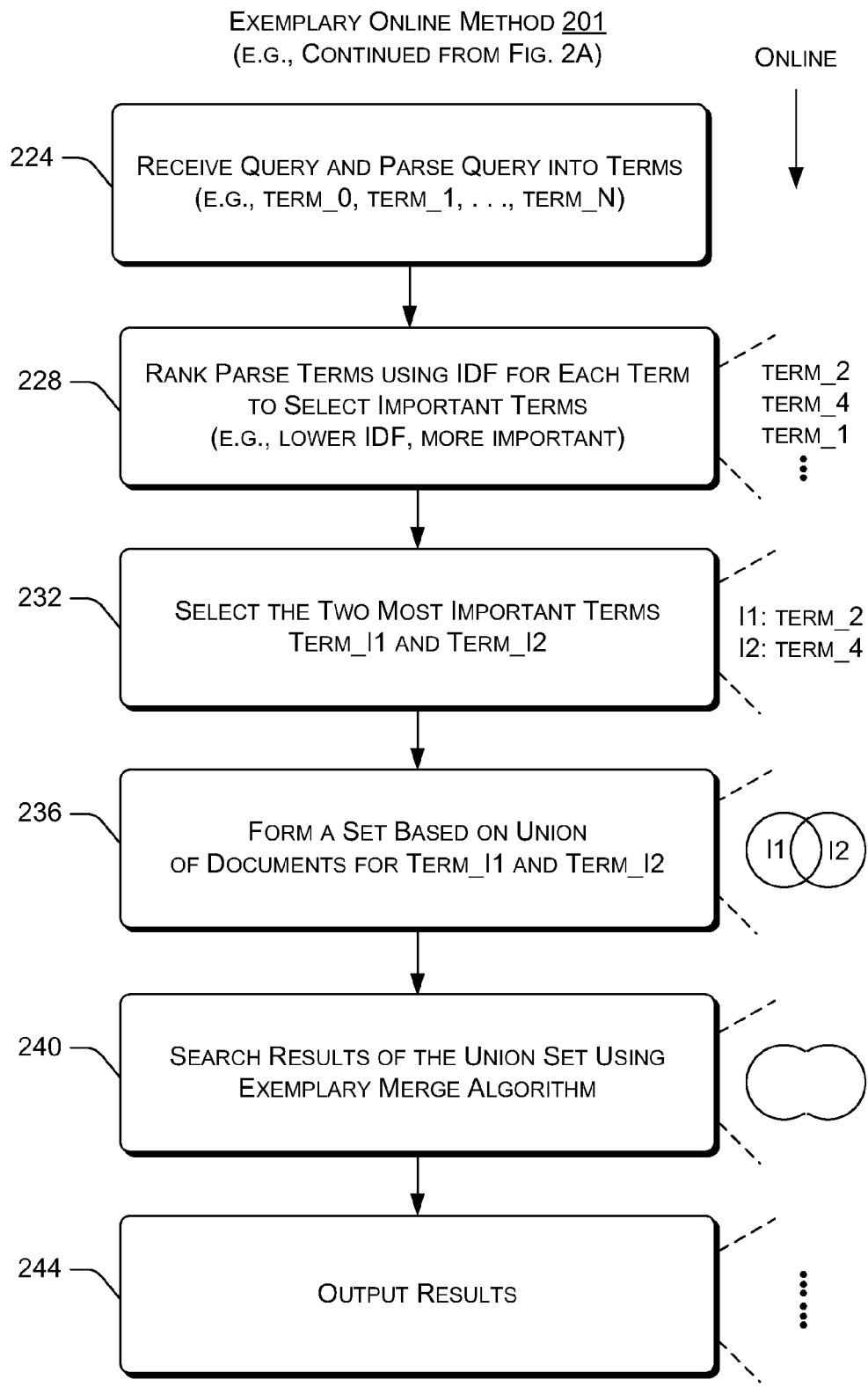
FIG. 2B is a diagram of the exemplary online method for selecting documents in response to a query.

FIG. 2A shows an exemplary offline method 200 while FIG. 2B shows an exemplary online method 201. These two methods can be used in conjunction to provide for online searching.

The method 200 includes a calculation block 204 that calculates BM25 scores offline. A storage block 208 stores the scores in a matrix; one raw set for each term (e.g., a set of documents for each term). A sort block 212 sorts the documents by BM25 scores. For each term, a selection block 216 selects the top K documents as important documents for the term where K is, or represents, a number. Next, for each term, the top K documents are stored or otherwise marked or identified for use in online retrieval. As described herein, an exemplary method includes, for a term, sorting documents by score and then selecting a number of the total number of documents (e.g., K documents) as important documents for the term.

As described herein an exemplary offline method for use in online information retrieval include, for each of a plurality of terms, selecting a predetermined number of top scoring documents for the term to form a corresponding document set for the term and storing (or marking) the document sets for subsequent access responsive to an online query. In such a method, the scoring may be BM25 scoring and the predetermined number of top scoring documents may be a number less than 25 or other number.

The method 201 of FIG. 2B includes a reception block 224 that receives a query and parses (if or as appropriate) the query into terms, which may be identified as term_0, term_1, . . . , term_N, where N is the total number of terms in the query after parsing. A rank block 228 ranks the parse terms using an inverse document frequency (IDF or idf) where the lower the IDF value the more important the term. According to the example of FIG. 2B, the selection block 232 selects the two most important terms, labeled term_I1 and term_I2.

Given the two most important terms, a formation block 236 forms a set based on a union of a set documents for term_I1 and a set of documents for term_I2. A search block 240 searches the results of the union (e.g., the union set) using an exemplary merge algorithm (see, e.g., FIG. 3). An output block 244 allows for output of results online.

As described herein, an exemplary method for online information retrieval includes receiving a query that includes a plurality of terms; accessing documents or information about documents; based on the accessing, ranking the plurality of terms for importance; selecting a number of ranked terms based on importance where each selected, ranked term has a corresponding document set where each document in a respective document set has a document identification number; forming a union set based on the document sets associated with the selected number of ranked terms; and, for a document identification number in the union set, scanning a document set corresponding to an unselected term for a matching document identification number. In such a method, the ranking can include use of an inverse document frequency algorithm.

Figure 3:
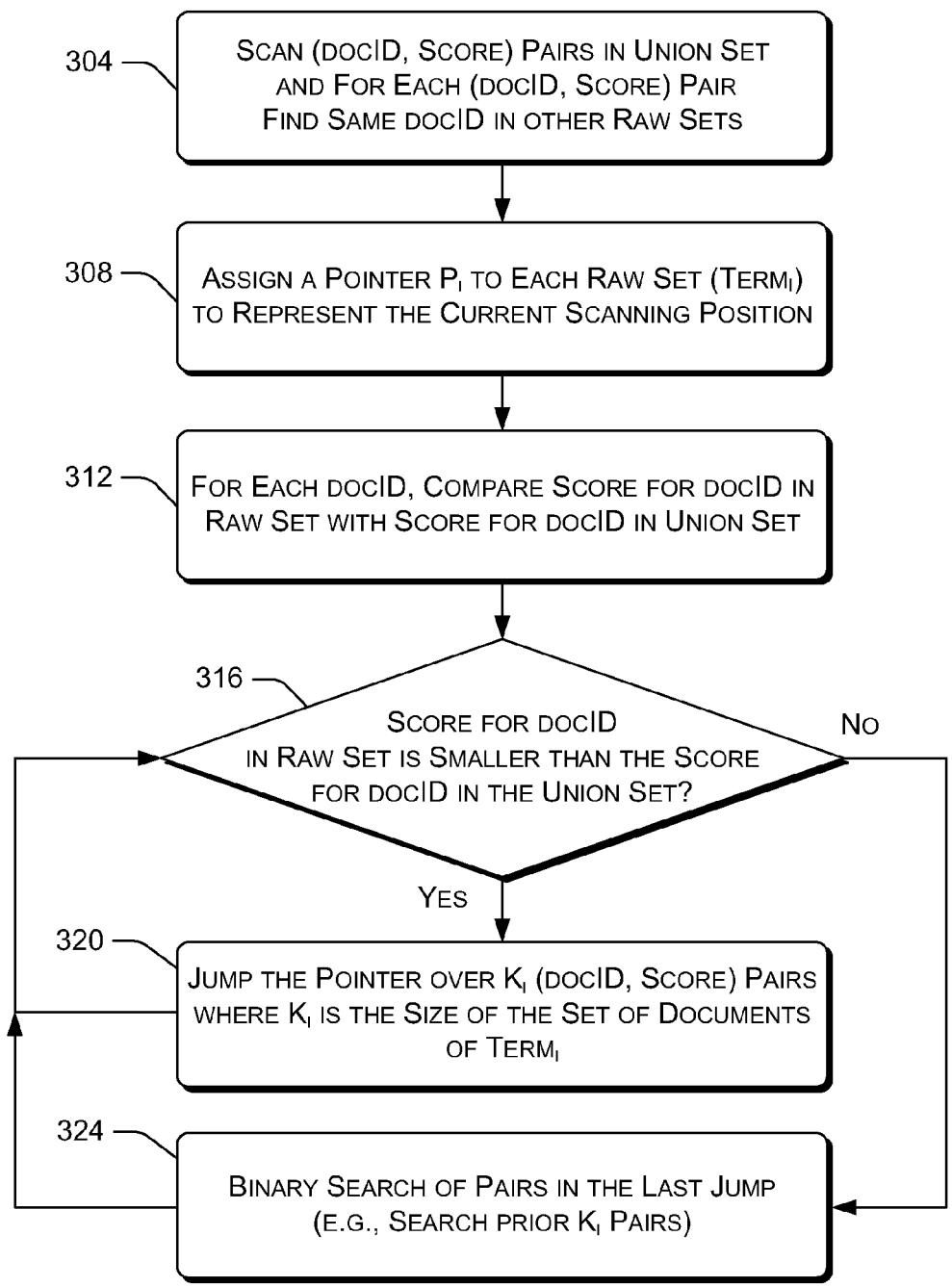
FIG. 3 is a diagram of an exemplary merge method for determining scores for items.

FIG. 3 shows an exemplary merge method 300 (see, e.g., the search block 240 of FIG. 2B). In a scan block 304, the method 300 scans pairs in a union set formed by the union of two sets of documents where one set corresponds to one important term and the other set corresponds to another important term. An assignment block 308 assigns a pointer $P_i$ to each raw set (a corresponding $term_i$) to represent the current scanning position. A comparison block 312, for each docID, compares the score for the docID in the raw set with the score for docID in the union set. A decision block 316 decides if the score for the docID in the raw set is smaller than the score for the docID in the union set. If the decision is "Yes", then the method 300 continues in a jump block 320 that jumps the pointer $P_i$ over $k_i$ pairs (e.g., (docID, score) pairs) where $k_i$ is the size of the set of documents of $term_i$. However, if the decision is "No", then the method 300 enters a binary search block 324 that uses a binary search of pairs in the last jump (e.g., search prior $k_i$ pairs). For example, if "s" is the size of the important document set (i.e., the union set) for the important terms and if $Size_i$ is the size of the document set of $term_i$, then $k_i$ is $Size_i/s$.

With respect to a binary search, consider an example where:

| [term$_0$]* | docID: 1 5 |
| [term$_1$]* | docID: 5 9 |
| [term$_2$] | docID: 1 2 3 4 5 6 8 9 12 |

In this example, the two most important terms are $term_0$ and $term_1$ (indicated by asterisks); thus, s=|1 5 9|=3 (i.e., the union set) and $k_2$=9/3=3 (i.e., size of documents set of $term_2$). To commence, the search first selects the docID "1" from the union set |1 5 9| and sets the pointer $P_2$=0; noting that the current docID (e.g., cur_docID) in [$term_2$] is "1" as well. Then the search selects the next docID "5" from the union set |1 5 9|, since the pointer $P_2$=0 and the cur_docID is "1", the pointer is set as follows $P_2$=$P_2$+$k_2$=3 and the cur_docID is "4" for the set of documents for $term_2$. Because the cur_docID "4" is smaller than "5", the pointer is set as follows $P_2$=$P_2$+$k_2$=6 where the cur_docID is "8" for the set of documents for $term_2$.

Accordingly, a binary search performed in the zone with pointer position=3 to pointer position=6 (i.e., docIDs [4 5 6 8] of the set of documents for $term_2$) finds "5". After getting "5" by binary search, the search is left with the pointer $P_2$ in position 4, which is the position of docID "5" in the set of documents for $term_2$. To continue, the binary search would select the docID "9" from the union set and repeat the process for docID "9" as was performed for the docID "5".

An exemplary method for use in information retrieval includes sorting documents using a score associated with a term, selecting the top "K" sorted documents for use in a document retrieval process (e.g., the number "K" may be selected as appropriate based on any of a variety of criteria or formula or formulas), receiving a plurality of terms, optionally as a query, ranking each of the plurality of terms for importance using an inverse document frequency value, selecting the two most important ranked terms, forming a union set based on two document sets, one for each of the two most important ranked terms, wherein the documents of each set comprise the top "K" documents for a respective term and scanning the documents using document identification numbers of documents in the union set to find documents in other sets having identification numbers that match those of the documents in the union set. In such a method, scanning may use of a pointer that indicates a scanning position. As already mentioned, scanning may use jumping and binary searching.

An example follows:

BM25: A BM25 algorithm is used to rank the relevance of Ads in a system. Following is the description of BM25 algorithm.

BM25 scoring: Okapi ranking formula provides a mechanism for computing the IR score of a document based on the combination of some most frequently used document features: term frequency (TF), document frequency (DF), and document length.

BM25 rank formula: The basic formula of BM25 is:

$$\sum_{T \in Q} w^{(1)} \frac{(k_1 + 1)tf}{K + tf} \frac{(k_3 + 1)qtf}{k_3 + qtf}$$

Where
Q is a query, containing terms T
$w^{(1)}$ is either the Robertson/Sparck Jones weight of T in Q $$\log \frac{(N - n + 0.5)}{(n + 0.5)}$$

N is the number of items (documents) in the collection
n is the number of documents containing the term
R is the number of documents known to be relevant to a specific topic
r is the number of relevant documents containing the term
S is the number of documents known to be non relevant to a specific topic
s is the number of nonrelevant documents containing the term
K is $k_1((1-b)+b.dl/avdl)$
$k_1$, b, $k_2$, and $k_3$ are parameters which depend on the on the nature of the queries and possibly on the database.

For some TREC-7 experiments, $k_1$ was set to 1.2 and b was set to 0.75, except where stated otherwise; $k_2$ was always set to zero and $k_3$ was set to a number from 0 to 1000. In the equation, "tf" is the frequency of occurrence of the term within a specific document and "qtf" is the frequency of the term within the topic from which Q was derived. "dl" and "avdl" are the document length and average document length (e.g., arbitrary units), respectively.

Pre-calculation:

$$S = \sum_{T \in Q} w^{(1)} \frac{(k_1 + 1)tf}{K + tf}$$

Online idf calculation $$idf_q = \frac{(k_3 + 1)qtf}{k_3 + qtf}$$

Inverted Indexing: Generally inverted indexing technology is used to speed up the online retrieval algorithm. The index table is a matrix. The BM25 score is calculated offline and stored in a matrix. Each raw of the matrix is for a term. The (docID, score) pairs are stored for online retrieval and each pair is sorted by the document id (docID). When a query is submitted, the query is parsed into terms. From the terms, several raws are provided and a merge algorithm is used to calculate the final score of each document. The merge algorithm uses Priority Queue, which is implemented by heap or loser tree. The total time complexity is $O(\Sigma_{0 \leq i < n} L_i \log n)$, where n is the term number in the query and $L_i$ is the length of the raw for the i-th term ($term_i$). In this approach, the results will be in the document set $\cup_{0 \leq i < n} Doc_{term_i}$.

Exemplary Technique: An exemplary query term discrimination approach searches the results in important document sets of important query terms. Accordingly, in an offline pre-calculation, an exemplary technique includes sorting documents of each term by BM25 scores and selecting the top K documents as the important documents of this term. When a query is submitted, the query may be parsed into terms and the exemplary technique can rank the terms to aid in selection of important terms. For example, IDF can be used to select the important terms where the lower the IDF value a term has, the more important the term is. For example, a technique may select the two most important terms (e.g., $term_0$ and $term_1$) and search the results in the union set of the documents for these selected important terms (e.g., the union set $Doc_{term_0} \cup Doc_{term_1}$). While two terms is given as an example, more than two terms may be deemed important terms.

As already mentioned, an exemplary merge algorithm may be employed. With respect to time complexity, the time complexity can be described as: $O(2ns+s \log \Pi_{0 \leq i < n} k_i)$, where s is the size of the important document set for the important terms, where $Size_i$ is the size of the document set of $term_i$ and where $k_i$ is $Size_i/s$ (or $Size_i = k_i$ times s).

An exemplary merge algorithm may include: Scanning the (docID, score) pair in $Doc_{term_0} \cup Doc_{term_1}$ one by one, and finding the pairs of the same docID in the other raw sets (i.e., sets for terms not deemed "important" or included in the union set). For those raw sets, a pointer $P_i$ is assigned for each raw set to stand for a current scanning position. Accordingly, for each iteration, a comparison of the docID in $p_i$ occurs with the current docID in the union set $Doc_{term_0} \cup Doc_{term_1}$. If the docID in $p_i$ is smaller, the algorithm lets $p_i$ jump over $k_i$ pairs where $k_i$ was previously defined above. In such a manner, $p_i += k_i$. Then a subsequent comparison can be performed where, if the docID in $p_i$ in still smaller the algorithm lets $p_i$ jump again and if this condition is not met, then the algorithm can call for use of a binary search to search the pairs in the last jump (e.g., a prior jump).

According to such an exemplary technique, for each term of a query, a jump can occur s times and a binary search can occur S times in a zone with the size $k_i$. Such a retrieval algorithm can greatly improve performance. Further, since the most importance documents are scanned, accuracy does not decrease when compared to the conventional approach (see, e.g., the conventional method of FIG. 1).

As described herein, an exemplary method for use in information retrieval includes, for each of a plurality of terms, selecting a predetermined number of top scoring documents for the term to form a corresponding document set for the term; receiving a plurality of terms, optionally as a query; ranking the plurality of terms for importance based at least in part on the document sets for the plurality of terms where the ranking uses an inverse document frequency algorithm; selecting a number of ranked terms based on importance where each selected, ranked term has its corresponding document set where each document in a respective document set has a document identification number; forming a union set based on the document sets associated with the selected number of ranked terms; and, for a document identification number in the union set, scanning a document set corresponding to an unselected term for a matching document identification number.

In the foregoing method, the scanning can use a pointer that indicates a scanning position in a document set corresponding to an unselected term. Further, scanning may rely on jumping and/or binary searching. As shown in various examples, the number of ranked terms may be two; noting other numbers may be used. The foregoing method may include repeating the scanning for more than one document identification number in the union set. As an example, the predetermined number of documents may be a number less than approximately 25.

An exemplary method may include comparing a document score associated with a document identification number in a document set corresponding to an unselected term to a document score associated with the document identification number in a union set. In such a method, based at least in part on the comparing, jumping a pointer for the document set corresponding to the unselected term or binary searching in the document set corresponding to the unselected term may occur. For example, jumping can occur if the document score associated with a document identification number in the document set corresponding to the unselected term is less than the document score associated with the document identification number in the union set and binary searching can occur if the document score associated with a document identification number in the document set corresponding to the unselected term is not less than the document score associated with the document identification number in the union set.

Figure 4:
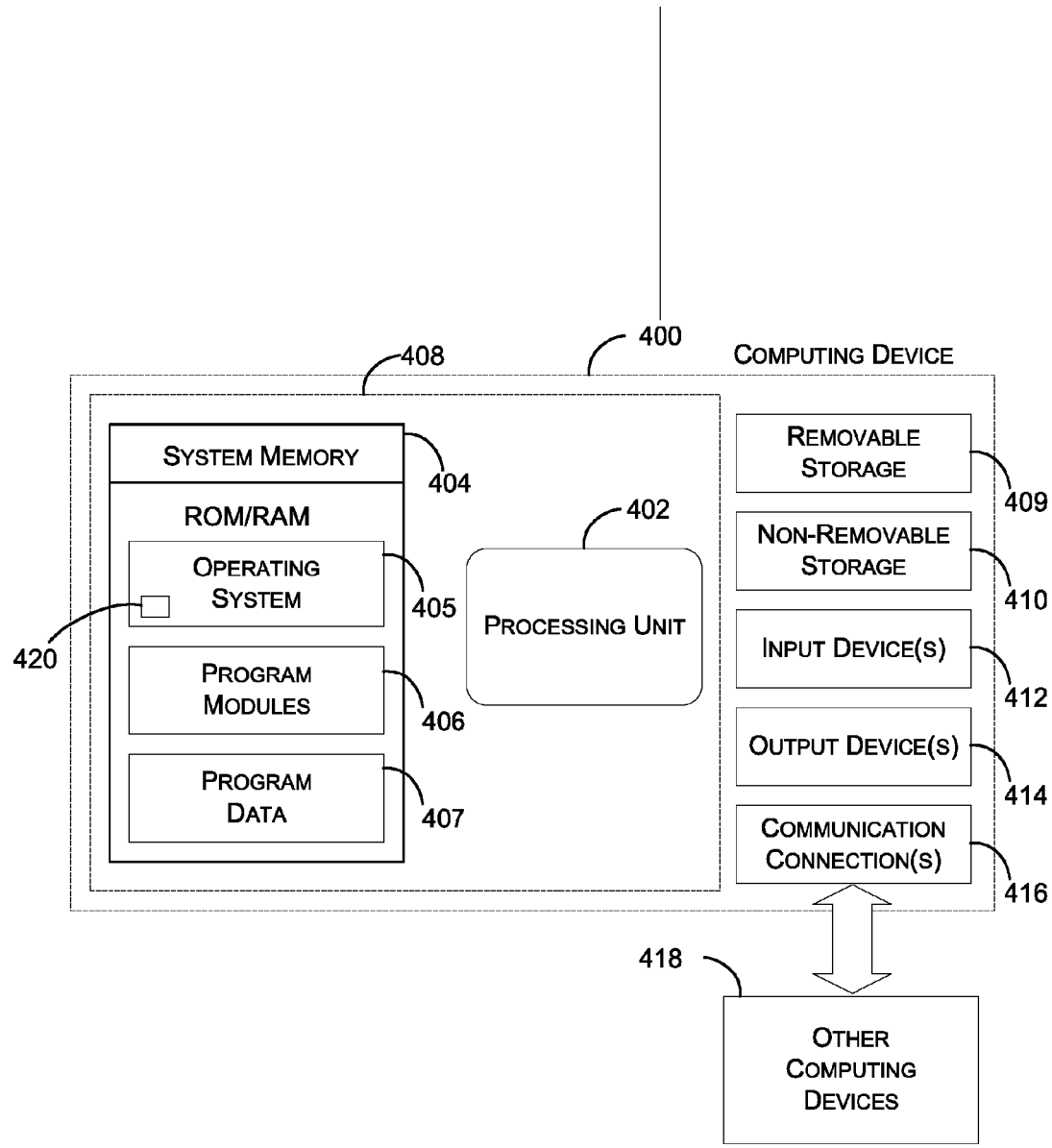
FIG. 4 is a diagram of an exemplary computing environment suitable for implementing various method described herein.

FIG. 4 shows various components of an exemplary computing device 400 that may be used to implement part or all of various exemplary methods discussed herein.

The computing device shown in FIG. 4 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 4, one exemplary system for implementing an exemplary search mechanism includes a computing device, such as computing device 400. In a very basic configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination of the two. System memory 404 typically includes an operating system 405, one or more program modules 406, and may include program data 407. This basic configuration is illustrated in FIG. 4 by those components within dashed line 408.

The operating system 405 may include a component-based framework 420 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. These devices are well know in the art and need not be discussed at length here.

Computing device 400 may also contain communication connections 416 that allow the device to communicate with other computing devices 418, such as over a network. Communication connection(s) 416 is one example of communication media. Communication media may typically be embodied by computer readable instructions, data structures, program modules, or other data. By way of example, and not limitation, communication may occur via a wired network or direct-wired connection.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

The invention claimed is:

1. A method for use in information retrieval, the method comprising:
    for each of a plurality of terms, selecting a predetermined number of top scoring documents for the term to form a corresponding document set for the term;
    receiving a query comprising a plurality of query terms;
    ranking the plurality of query terms received in the query based at least in part on the corresponding document sets for each of the plurality of query terms, wherein the ranking comprises using an inverse document frequency algorithm;
    selecting a number of ranked query terms from the plurality of query terms, wherein each selected ranked query term comprises its corresponding document set and each document in a respective document set comprises a document identification number;
    forming a union set based on the document sets associated with the selected number of ranked query terms; and
    for a document identification number in the union set, scanning a document set corresponding to an unselected query term for a matching document identification number, wherein the unselected query term is included in the query comprising the plurality of query terms.

2. The method of claim 1, wherein the scanning comprises use of a pointer that indicates a scanning position in the document set corresponding to the unselected query term.

3. The method of claim 1, wherein the scanning comprises use of jumping.

4. The method of claim 1, wherein the scanning comprises use of jumping and binary searching.

5. The method of claim 1, wherein the number of ranked query terms comprise two.

6. The method of claim 1 further comprising repeating the scanning for more than one document identification number in the union set.

7. The method of claim 1, wherein the predetermined number of documents comprises a number less than 25.

8. The method of claim 1 further comprising, after a matching document identification number is determined from the scanning, comparing a document score associated with the matching document identification number in the document set corresponding to the unselected query term to a document score associated with the document identification number in the union set.

9. The method of claim 8 further comprising, based at least in part on the comparing, jumping a pointer for the document set corresponding to the unselected query term or binary searching in the document set corresponding to the unselected query term.

10. The method of claim 9, wherein jumping occurs if the document score associated with a document identification number in the document set corresponding to the unselected query term is less than the document score associated with the document identification number in the union set.

11. The method of claim 9, wherein binary searching occurs if the document score associated with a document identification number in the document set corresponding to the unselected query term is not less than the document score associated with the document identification number in the union set.

12. The method of claim 1, wherein the scoring the documents comprises BM25 scoring.

13. The method of claim 1 further comprising outputting a list of documents.

14. One or more computer memory devices comprising computer-executable instructions to perform the method of claim 1.

15. An offline method for use in online information retrieval, the method comprising:
for each of a plurality of terms, selecting a predetermined number of top scoring documents for the term to form a corresponding document set for the term; and
storing the document sets for subsequent access responsive to an online query;
receiving a query comprising a plurality of query terms;
ranking the plurality of query terms using an inverse document frequency algorithm;
selecting at least two ranked query terms from the plurality of query terms, wherein each selected, ranked query term comprises a corresponding document set of top scoring documents, wherein the selecting the at least two ranked query terms leaves at least one unselected query term from the plurality of query terms;
forming a union set based on the document sets associated with the at least two ranked query terms;
merging the union set with a document set corresponding to the at least one unselected query term; and
outputting results based on the merging.

16. The method of claim 15, wherein the scoring comprises BM25 scoring and wherein the predetermined number of top scoring documents comprises a number less than 25.

17. One or more computer memory devices comprising computer-executable instructions to perform the method of claim 15.

18. An online information retrieval method comprising:
receiving a query that comprises a plurality of terms;
accessing documents or information about documents;
based on the accessing, ranking the plurality of terms using an inverse document frequency algorithm;
selecting a number of ranked terms, wherein each selected ranked term comprises a corresponding document set and each document in a respective document set comprises a document identification number;
forming a union set based on the document sets associated with the selected number of ranked terms; and
for a document identification number in the union set, scanning a document set corresponding to an unselected term for a matching document identification number, wherein the unselected term is included in the query comprising the plurality of terms.

19. One or more computer memory devices comprising processor executable instructions to perform the method of claim 18.

* * * * *